US012576918B2

(12) United States Patent
Satoi et al.

(10) Patent No.: US 12,576,918 B2
(45) Date of Patent: Mar. 17, 2026

(54) VEHICLE REAR PORTION STRUCTURE

(71) Applicant: TOYOTA JIDOSHA KABUSHIKI KAISHA, Toyota (JP)

(72) Inventors: Taisuke Satoi, Okazaki (JP); Yuta Egawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 18/498,486

(22) Filed: Oct. 31, 2023

(65) Prior Publication Data

US 2024/0208584 A1 Jun. 27, 2024

(30) Foreign Application Priority Data

Dec. 26, 2022 (JP) ................................. 2022-207922

(51) Int. Cl.
| | |
|---|---|
| *B62D 25/08* | (2006.01) |
| *B60G 13/00* | (2006.01) |
| *B62D 25/04* | (2006.01) |
| *B62D 29/00* | (2006.01) |

(52) U.S. Cl.
CPC ......... B62D 25/087 (2013.01); B60G 13/003 (2013.01); B62D 25/04 (2013.01); B62D 25/088 (2013.01); B62D 29/008 (2013.01)

(58) Field of Classification Search
CPC .. B62D 25/2027; B62D 25/02; B62D 25/088; B62D 25/087; B62D 29/008; B60G 13/003

USPC ...................................................... 296/193.05
See application file for complete search history.

(56) References Cited

U.S. PATENT DOCUMENTS 6,193,273 B1 * 2/2001 Novak ................... B62D 21/00
280/781
2021/0016840 A1 * 1/2021 Moss ................... B62D 21/152

FOREIGN PATENT DOCUMENTS

| JP | 06286652 | A | * | 10/1994 |
|---|---|---|---|---|
| JP | H06-286652 | A | | 10/1994 |

OTHER PUBLICATIONS

Japanese Patent No. 06286652-A, English translation dated Jul. 26, 2023 (Year: 1994).*

* cited by examiner

*Primary Examiner* — Caroline N Butcher
(74) *Attorney, Agent, or Firm* — SoraIP, Inc.

(57) ABSTRACT

The vehicle rear portion structure includes a pair of rear portion structural members spaced apart in the vehicle width direction, a pair of rear side members spaced apart in the vehicle width direction, and a cross-connection member connecting the pair of rear portion structural members to each other, the rear portion structural member is a hollow member in which a body portion, a tower portion, and a suspension member portion are integrally cast, and a pair of arm portions connected to the tower portion.

5 Claims, 4 Drawing Sheets

REDUCED VIEW OF PART A

VEHICLE REAR PORTION STRUCTURE

CROSS-REFERENCE TO RELATED APPLICATION

This application claims priority to Japanese Patent Application No. 2022-207922 filed on Dec. 26, 2022, incorporated herein by reference in its entirety.

BACKGROUND

1. Technical Field

This specification discloses a vehicle rear portion structure.

2. Description of Related Art

Generally, a suspension, a suspension member, a suspension tower, and a rear side member are disposed at the rear of a vehicle. Japanese Unexamined Patent Application Publication No. 6-286652 (JP 6-286652 A) discloses a technique of integrally forming a suspension member and a suspension tower by casting for the purpose of improving collision safety. According to such technology, collision safety can be improved to some extent.

SUMMARY

However, JP 6-286652 A does not sufficiently examine the structure of a portion of vehicle that is rearward of the cast member. Therefore, this specification discloses a vehicle rear portion structure that can further improve the rigidity of the vehicle rear portion.

The vehicle rear portion structure disclosed in the specification includes: a pair of rear portion structural members spaced apart in a vehicle width direction; a pair of rear side members spaced apart in the vehicle width direction; and a cross-connection member connecting the rear portion structural members to each other.

Each of the rear portion structural members is a hollow member in which a body portion, a tower portion, and a suspension member portion are integrally cast.

The body portion includes a front end connected to a rear pillar and a rear end connected to a rear side member of the rear side members.

The tower portion has a tower shape with a downward opening so as to receive a part of a suspension device, and stands upward from the body portion.

The suspension member portion includes a front end connected to a rocker and extends downwardly from the body portion to support the suspension device.

The rear side member and the cross-connection member are tubular extruded members.

The cross-connection member includes a connecting portion extending in the vehicle width direction in a portion of a vehicle that is rearward of the rear portion structural member, and a pair of arm portions extending forward in a vehicle front-rear direction from both ends of the connecting portion in the vehicle width direction and connected to the tower portions, and the cross-connection member is substantially U-shaped and projects rearward in the vehicle front-rear direction in a plan view.

By providing the cross-connection member, the rigidity of a portion of the vehicle that is rearward of the rear portion structural members is further improved. Accordingly, the deformation of the vehicle body is suppressed in the event of a rear-end collision.

In this case, the vehicle rear portion structure may further include a first cross member connecting vicinities of lower ends of the tower portions of the rear portion structural members in the vehicle width direction, and in a plan view, a first annular shape projecting rearward in the vehicle front-rear direction may be made by the first cross member, the tower portions, and the cross-connection member.

As the first annular shape is made, the rigidity of a portion of the vehicle that is rearward of the rear portion structural members is further improved.

In this case, in the vehicle rear portion structure, an access opening of a luggage space and a rear door that opens and closes the access opening may be further provided, the access opening may extend substantially horizontally at a position approximately at the same height as the cross-connection member, the cross-connection member may surround a part of a periphery of the access opening, and the rear door may be disposed above the cross-connection member.

Such a configuration improves the rigidity of the periphery of the access opening. Consequently, the rigidity in the periphery of the access opening is improved. Also, in this case, the rear door is supported by the cross-connection member, so that the rigidity of the rear door is improved.

In addition, the vehicle rear portion structure may further include a pair of connecting members connected to the pair of rear portion structural members, and each of the connecting members may join a front upper corner of the body portion and an upper portion of the tower portion.

With such a configuration, when a rear collision occurs, the collision load applied to the cross-connection member is transmitted to the rear pillars via the connecting members. Accordingly, the collision energy is effectively consumed or dissipated, so that the vehicle cabin is adequately protected.

In this case, the vehicle rear portion structure may further include a second cross member connecting front ends of the rear portion structural members to each other in the vehicle width direction, each of the connecting members may extend obliquely rearward and upward from the front upper corner of the body portion, and then curve to extend rearward in the vehicle front-rear direction, a rear end of the connecting member may be positioned on an extension line extended forward in the vehicle front-rear direction from an arm portion of the arm portions, and a second annular shape projecting rearward in the vehicle front-rear direction in a plan view may be made by the second cross member, the connecting members, and the cross-connection member.

As the second annular shape is made, the rigidity of a vehicle rear portion is further improved. Consequently, the vehicle cabin is more adequately protected in the event of a rear-end collision.

According to the vehicle rear portion structure disclosed in the specification, the rigidity of a portion of the vehicle that is rearward of the rear portion structural members is further improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
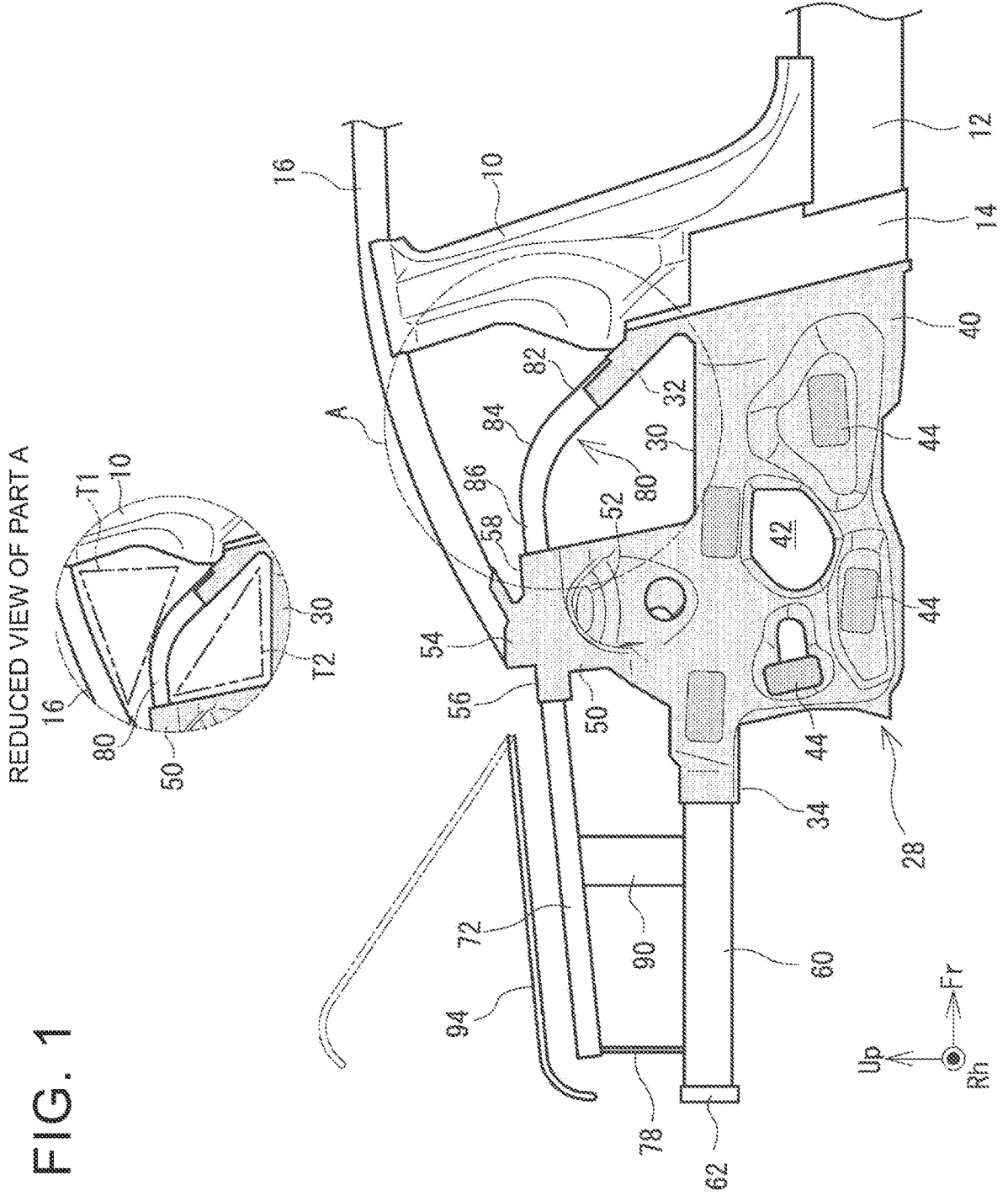
FIG. 1 is a right side view of the vehicle rear portion structure.
Figure 2:
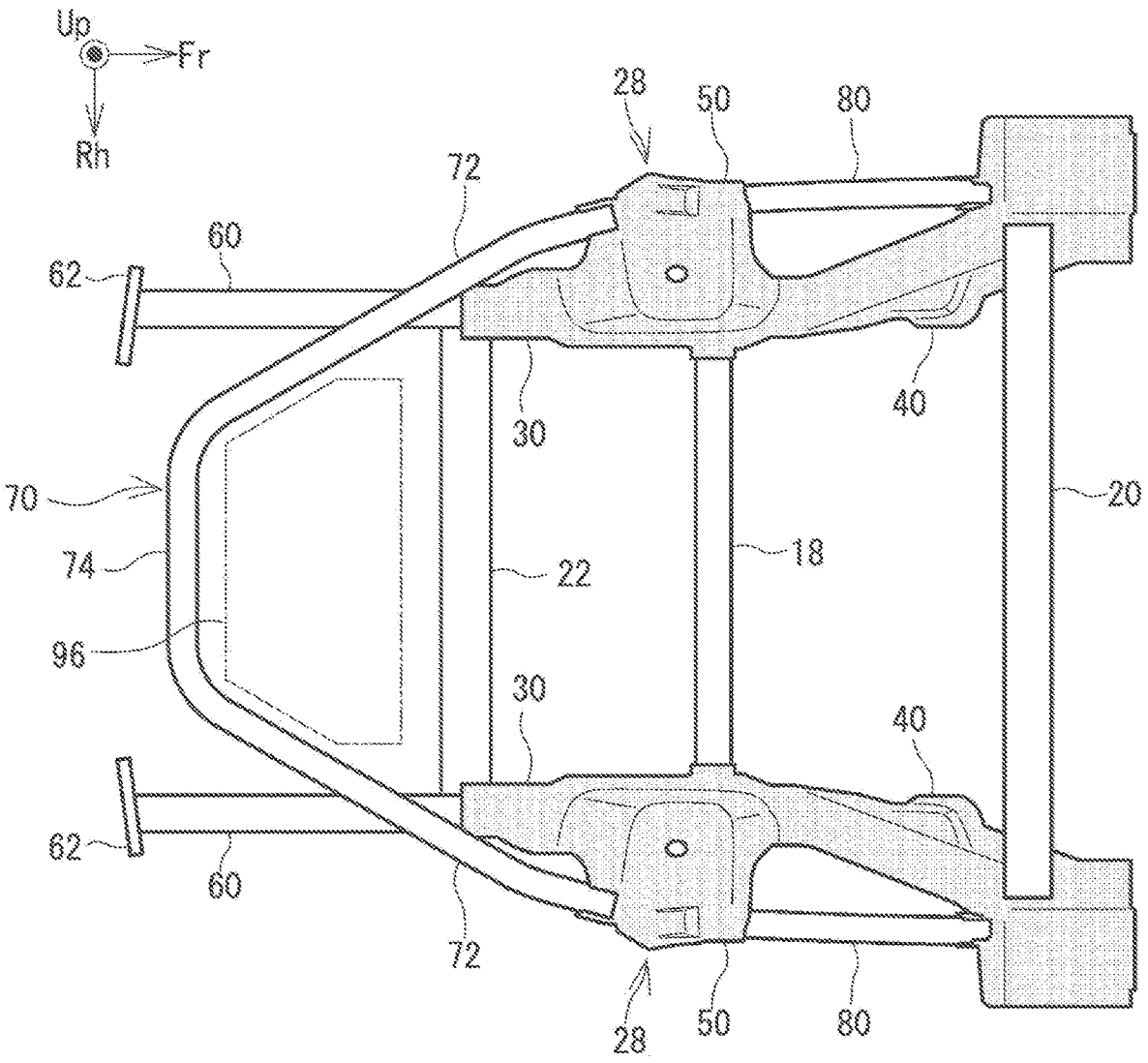
FIG. 2 is a plan view of the vehicle rear portion structure.

The vehicle rear portion structure will be described below with reference to the drawings. FIG. 1 is a right side view of the vehicle rear portion structure. Also, FIG. 2 is a plan view of the vehicle rear portion structure. In each figure, "Fr" indicates the front of the vehicle. In each figure, "Up" indicates the upper side of the vehicle. In each figure, "Rh" indicates the right side of the vehicle. FIG. 2 illustration of the rear pillar 10, the rocker 12, the roof rail 16, and the rear door 94 is omitted.

The vehicle rear portion structure is generally bilaterally symmetrical, as shown in FIG. 2. Therefore, most of the elements included in the vehicle rear portion structure are arranged in two with an interval in the vehicle width direction. For example, rear pillars 10 (not shown in FIG. 2), rockers 12 (not shown in FIG. 2), roof rails 16 (not shown in FIG. 2), rear portion structural members 28, rear side members 60, and connecting members 80 are each arranged two by two.

As shown in FIG. 1, the rear pillar 10 is a frame member extending in the vertical direction of the vehicle. A lower end of the rear pillar 10 is connected to a rear end of the rocker 12. Also, the upper end of the rear pillar 10 is connected to a roof rail 16.

The rocker 12 is a frame member extending in the vehicle front-rear direction in the lower portion of the vehicle. The roof rail 16 is a frame member arranged at the boundary between the roof and the sides of the vehicle. A rear pillar 10 is connected to an intermediate portion of the roof rail 16.

A rear portion structural member 28 is arranged behind the rear pillar 10. In FIG. 1, the rear portion structural member 28 is hatched in gray. The rear portion structural member 28 is a casting member made of metal such as aluminum. Further, the rear portion structural member 28 is a hollow member having a thickness in the vehicle width direction and having a space formed therein. A front end of the rear portion structural member 28 is connected to the rear pillar 10 and the rocker 12. Also, a connection plate 14 is joined to the rear portion structural member 28, the rear pillar 10, and the rocker 12 to reinforce this connection.

The rear portion structural member 28 is roughly divided into a body portion 30, a suspension member portion 40, and a tower portion 50, as shown in FIG. 1. The body portion 30 has a front end connected to the rear pillar 10 and a rear end connected to the rear side member 60. In other words, the body portion 30 is a portion elongated toward the rear of the vehicle. The body portion 30 functions as a side member. A first assembly portion 32 is formed at the front upper corner of the body portion 30. The first assembly portion 32 is a portion to which a front end of a connecting member 80, which will be described later, is assembled. The first assembly portion 32 extends from the front upper corner portion of the body portion 30 toward the oblique rearward upper direction of the vehicle. A second assembly portion 34 is formed at the rear end of the body portion 30. The second assembly portion 34 is a portion to which a front end of a rear side member 60, which will be described later, is assembled. The second assembly portion 34 has a rectangular tubular shape into which the rectangular tubular rear side member 60 can be inserted.

The suspension member portion 40 is connected to the lower side of the body portion 30. A front end of the suspension member portion 40 is connected to the rear pillar 10 and the rocker 12. The suspension member portion 40 functions as a suspension member that supports a suspension system (not shown). An opening 42 is formed substantially in the center of the suspension member portion 40 for passing a rear wheel drive shaft (not shown). A plurality of fastening seats 44 are formed in the body portion 30 and the suspension member portion 40. In FIG. 1, the fastening seats 44 are hatched in dark gray. The fastening seats 44 are portions to which the arm portion 72 of the suspension system is fastened.

The tower portion 50 stands from the upper end of the body portion 30. Tower portion 50 functions as a suspension tower that houses a portion of the suspension shock absorber (not shown). The tower portion 50 has a tower shape that opens downward. In other words, the tower portion 50 has a mounting recess 52 that opens downward. The shock absorber is inserted into the mounting recess 52 from below and fixed to the tower portion 50.

The tower portion 50 is provided with a third assembly portion 54, a fourth assembly portion 56 and a fifth assembly portion 58. The third assembly portion 54 is arranged on the top surface of the tower portion 50. A rear end of the roof rail 16 is attached to the third assembly portion 54. The fourth assembly portion 56 is arranged near the upper end and at the rear end of the tower portion 50. The rear end of the cross-connection member 70 is assembled to the fourth assembly portion 56. The fourth assembly portion 56 has a rectangular tubular shape. A cross-connection member 70 can be inserted into the fourth assembly portion 56. The fifth assembly portion 58 is arranged near the upper end and at the front end of the tower portion 50. A front end of a connecting member 80 is assembled to the fifth assembly portion 58. The fifth assembly portion 58 has a rectangular tubular shape. A connecting member 80 can be inserted into the fifth assembly portion 58.

The rear side member 60 is a frame member extending rearward of the vehicle from the rear end of the body portion 30. The rear side member 60 is a rectangular tubular extrusion member. An end plate 62 is joined to the rear end of the rear side member 60.

A cross-connection member 70 is arranged above the vehicle from the rear side member 60. The cross-connection member 70 is a skeleton member made of a rectangular tube-shaped extruded member. As shown in FIG. 2, the cross-connection member 70 has a substantially U-shape that protrudes rearward of the vehicle in a plan view. More specifically, the cross-connection member 70 is roughly divided into a pair of arm portions 72 and a connecting portion 74. The arm portion 72 extends rearward of the vehicle from the fourth assembly portion 56 of the tower portion 50. More precisely, the arm portion 72 approaches the center in the vehicle width direction as it approaches the rear of the vehicle in plan view. Therefore, in plan view, the arm portion 72 crosses the rear side member 60. Further, the arm portion 72 approaches the rear side member 60 as it approaches the rear of the vehicle in a side view. The connecting portion 74 connects the rear ends of the two arm portions 72 in the vehicle width direction. A support plate 78 (see FIG. 1) is attached to the center of the connecting portion 74 in the vehicle width direction. The support plate 78 is a plate member that connects the connecting portion 74 and the floor panel (not shown). The rear end of the cross-connection member 70 is positioned forward of the vehicle relative to the rear end of the rear side member 60.

Figure 3:
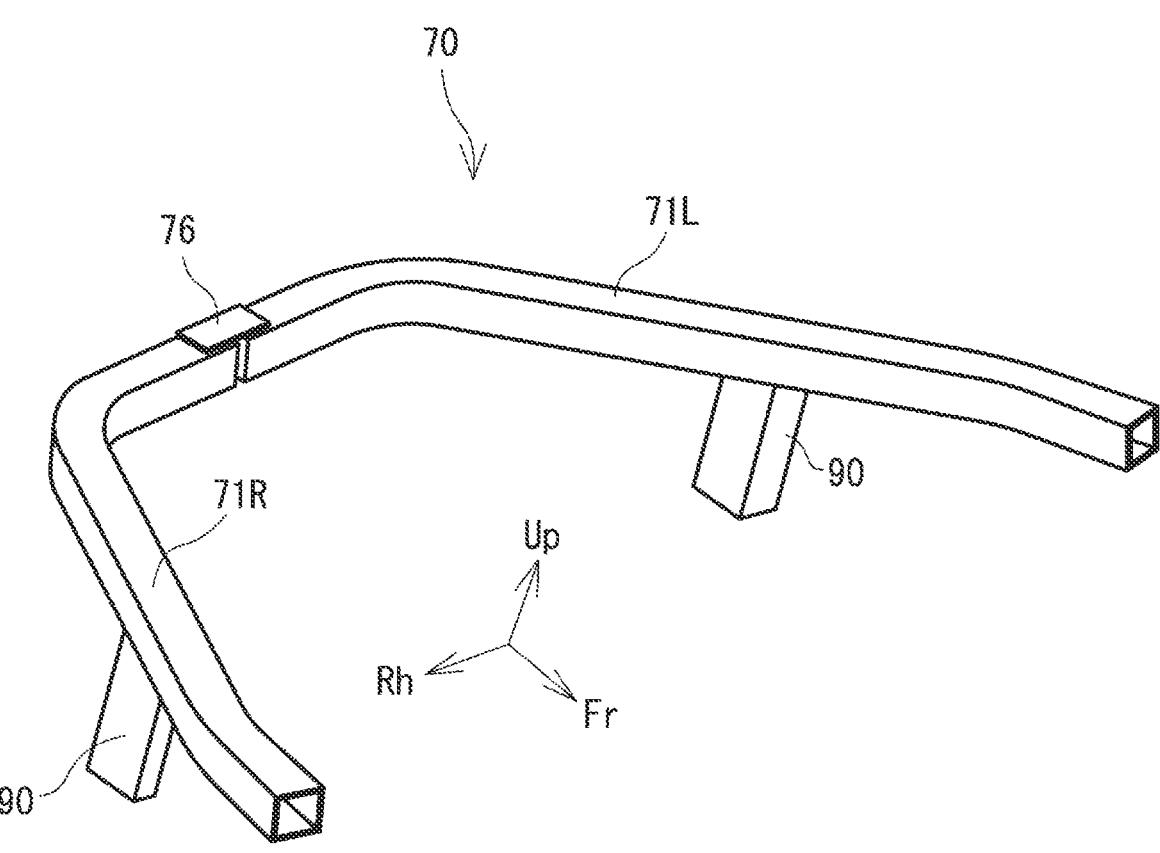
FIG. 3 is a perspective view showing another example of a cross-connection member.

In FIGS. 1 and 2, cross-connection member 70 is illustrated as a single member. However, the cross-connection member 70 may be configured by combining a right cross-connection piece 71R and a left cross-connection piece 71L, as shown in FIG. 3. In this case, the right cross-connection piece 71R is bilaterally symmetrical with the left cross-connection piece 71L. The right cross-connection piece 71R and the left cross-connection piece 71L are connected via a connection plate 76 at the connecting portion 74.

As shown in FIG. 1, the arm portion 72 of the cross-connection member 70 and the rear side member 60 are vertically connected by a vertical column 90. The vertical column 90 is a rectangular tubular member.

A floor panel (not shown) is arranged between the pair of rear side members 60. The space above the floor panel functions as a luggage space. An access opening 96 (see FIG. 2) is formed at the upper end of the luggage space for accessing the luggage space. As shown in FIG. 2, access opening 96 extends generally horizontally at approximately the same height as cross-connection member 70. The cross-connection member 70 then surrounds a portion of the periphery of this access opening 96.

As shown in FIG. 1, a rear door 94 is arranged above the cross-connection member 70. Rear door 94 is a lid member that closes access opening 96. A swing shaft extending in the vehicle width direction is set in the vicinity of the front end of the rear door 94. The rear door 94 is opened and closed by swinging around a swing shaft.

As shown in FIGS. 1 and 2, a connecting member 80 is further arranged between the tower portion 50 and the rear pillar 10. The connecting member 80 is a skeleton member that connects the upper front corner of the body portion 30 and the upper end of the tower portion 50. Moreover, the connecting member 80 is an extruded square tubular member or an integrated casting member. The connecting member 80 extends obliquely upward from the front upper corner of the body portion 30 and then curves to extend rearward of the vehicle. Therefore, the connecting member 80 is roughly divided into a rising portion 82 standing from the front upper corner of the body portion 30, a curved portion 84 and a lateral portion 86. A lower end of the rising portion 82 is attached to the first assembly portion 32. A rear end of the lateral portion 86 is attached to the fourth assembly portion 56. Here, as is clear from FIG. 1, the lateral portion 86 is positioned on an extension line of the arm portion 72 of the cross-connection member 70 in a side view.

As shown in FIG. 2, a plurality of cross members are also arranged in the rear portion of the vehicle. Specifically, the second cross member 20, the first cross member 18, and the third cross member 22 are spaced apart in the vehicle front-rear direction in order from the vehicle front side. The three cross members 18, 20, 22 are arranged at approximately the same height.

The first cross member 18 connects the vicinity of the lower ends of the tower portions 50 of the pair of rear portion structural members 28 in the vehicle width direction. The second cross member 20 connects the vicinity of the front ends of the pair of rear portion structural members 28 in the vehicle width direction. Both left and right ends of the third cross member 22 connect the vicinity of the rear ends of the pair of rear portion structural members 28 in the vehicle width direction.

Here, as is clear from the description so far, in the case of the vehicle rear portion structure disclosed in this specification, the suspension tower, suspension members, and side members are integrally cast as the rear portion structural member 28. With such a configuration, the number of parts of the vehicle can be reduced. In addition, the connecting portion between members tends to be a weak portion where stress tends to concentrate. By integrally casting the three members, it is possible to eliminate such connecting parts, thereby improving the rigidity of the vehicle body around the suspension system.

Further, in the case of the vehicle rear portion structure disclosed in this specification, the rear side member 60, the cross-connection member 70, and the connecting member 80 are all rectangular tubular extruded members. When such an extruded member is used as a frame member, vehicle rigidity can be improved more than when a frame member formed by joining a plurality of panel members is used.

Furthermore, a substantially U-shaped cross-connection member 70 projecting toward the rear of the vehicle in a plan view is arranged at the vehicle rear of the tower portion 50. The cross-connection member 70 surrounds a portion of the perimeter of the access opening 96. Here, normally, the rigidity around the access opening 96 tends to be lowered. Surrounding the access opening 96 with the cross-connection member 70 further enhances the rigidity of the rear portion of the vehicle. Further, in this case, the rear door 94 is supported by the cross-connection member 70, so that the rigidity of the rear door 94 is improved.

Figure 4:
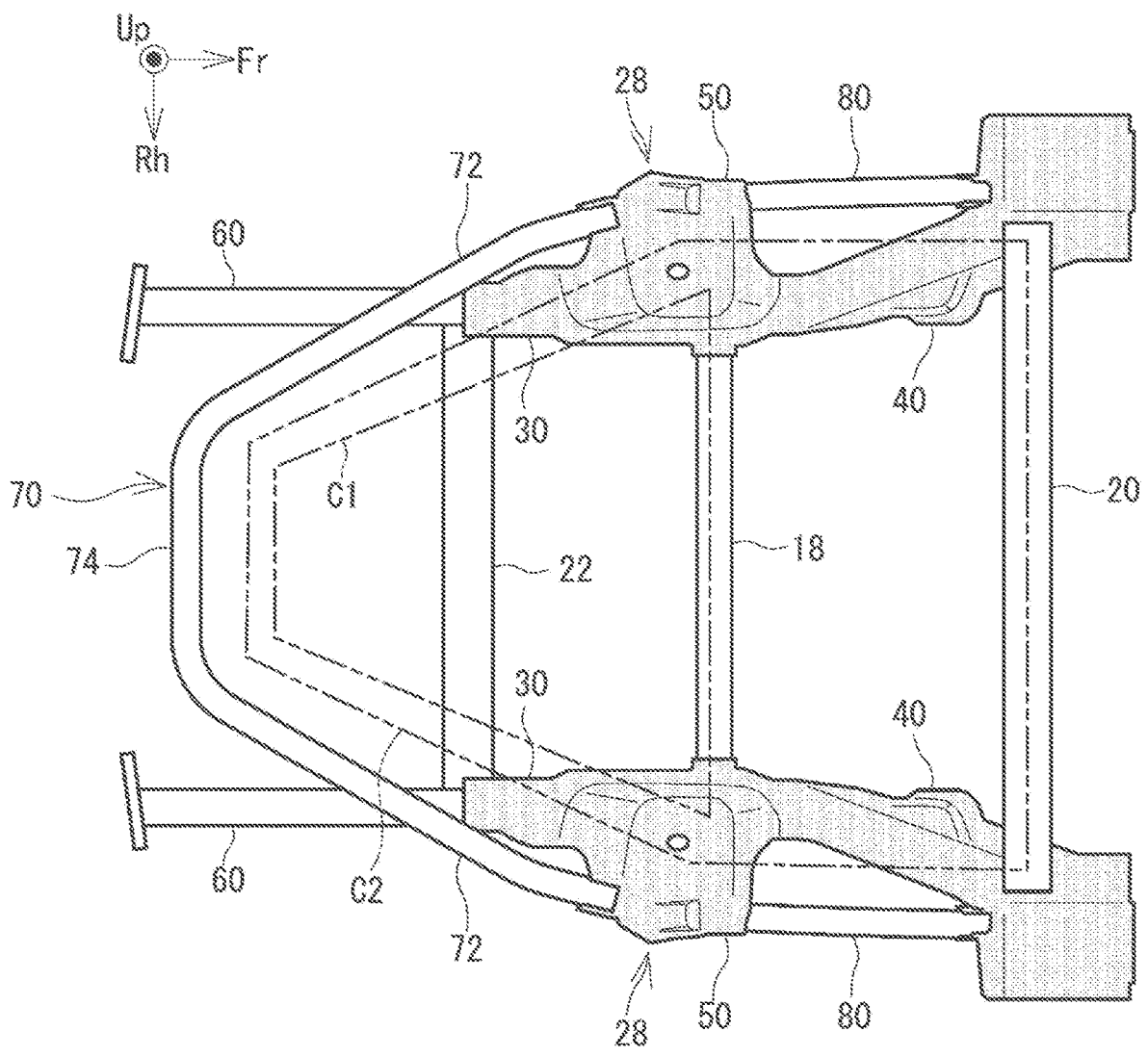
FIG. 4 is a plan view of the vehicle rear portion structure, and is a diagram for explaining the ring shape.

Also, as shown in FIG. 4, the cross-connection member 70 is connected to the first cross member 18 via a pair of tower portions 50. In other words, in plan view, the first annular shape C1 is formed by the cross-connection member 70, the pair of tower portions 50, and the first cross member 18 at the rear portion of the vehicle. By forming such a first annular shape C1, the rigidity of the cross-connection member 70 is further improved. Also, when a rear collision occurs, part of the collision load applied to the cross-connection member 70 is distributed to the first cross member 18. As a result, the collision load transmitted to the vehicle cabin can be reduced, and the vehicle cabin can be protected more appropriately.

Also, as shown in FIG. 4, a pair of tower portions 50 and a pair of connecting members 80 are interposed between the cross-connection member 70 and the second cross member 20. As a result, a second annular shape C2 that is convex toward the rear of the vehicle is also formed in the rear portion of the vehicle in a plan view. By forming such a second annular shape C2, the rigidity of the rear portion of the vehicle is further improved. Further, distortion of the vehicle body and the like are effectively prevented.

Also, in a side view, the arm portion 72 of the cross-connection member 70 and the lateral portion 86 of the connecting member 80 are aligned on a straight line. Therefore, most of the impact load applied to the connecting portion 74 of the cross-connection member 70 is smoothly transmitted to the connecting member 80 when a rear-end collision occurs. Furthermore, the collision load is distributed and transmitted from the connecting member 80 to the second cross member 20 and the rear pillar 10, thereby effectively dispersing or absorbing the collision energy. As a result, the vehicle cabin is more reliably protected in the event of a rear-end collision.

Moreover, the connecting member 80 has a substantially L shape extending rearward of the vehicle after standing obliquely upward from the front upper corner of the body portion 30. With such a configuration, a truss structure is formed between the rear pillar 10 and the tower portion 50. That is, a first truss T1 and a second truss T2 are formed between the rear pillar 10 and the tower portion 50 in a vehicle side view. The first truss T1 is formed by the roof rail 16, the rear pillar 10 and the connecting member 80. The second truss T2 is formed by the tower portion 50, the connecting member 80, and the upper end side of the body portion 30. By constructing such a truss structure, the rigidity of the rear portion of the vehicle can be further improved.

Note that the configurations described so far are all examples. As long as it has the configuration according to claim 1, other configurations may be changed. For example, the lateral portion 86 of the connecting member 80 may be offset vertically or horizontally with respect to the arm portion 72 of the cross-connection member 70. Also, the connecting member 80 may be omitted.

What is claimed is:

1. A vehicle rear portion structure comprising:

a pair of rear portion structural members spaced apart in a vehicle width direction;

a pair of rear side members spaced apart in the vehicle width direction; and a cross-connection member connecting the rear portion structural members to each other, wherein:

each of the rear portion structural members is a hollow member in which a body portion, a tower portion, and a suspension member portion are integrally cast;

the body portion includes a front end connected to a rear pillar and a rear end connected to a rear side member of the rear side members;

the tower portion includes a tower shape with a downward opening so as to receive a part of a suspension device, and stands upward from the body portion;

the suspension member portion includes a front end connected to a rocker and extends downwardly from the body portion to support the suspension device;

the rear side member and the cross-connection member are tubular extruded members; and the cross-connection member includes a connecting portion extending in the vehicle width direction in a portion of a vehicle that is rearward of the rear portion structural member, and a pair of arm portions extending forward in a vehicle front-rear direction from both ends of the connecting portion in the vehicle width direction and connected to the tower portions, the cross-connection member being substantially U-shaped and projecting rearward in the vehicle front-rear direction in a plan view.

2. The vehicle rear portion structure according to claim 1, further comprising a first cross member connecting vicinities of lower ends of the tower portions of the rear portion structural members in the vehicle width direction, wherein in a plan view, a first annular shape projecting rearward in the vehicle front-rear direction is made by the first cross member, the tower portions, and the cross-connection member.

3. The vehicle rear portion structure according to claim 2, wherein:

an access opening of a luggage space and a rear door that opens and closes the access opening are further provided;

the access opening extends substantially horizontally at a position approximately at the same height as the cross-connection member;

the cross-connection member surrounds a part of a periphery of the access opening; and the rear door is disposed above the cross-connection member.

4. The vehicle rear portion structure according to claim 1, further comprising a pair of connecting members connected to the pair of rear portion structural members, wherein each of the connecting members joins a front upper corner of the body portion and an upper portion of the tower portion.

5. The vehicle rear portion structure according to claim 4, further comprising a second cross member connecting front ends of the rear portion structural members to each other in the vehicle width direction, wherein:

each of the connecting members extends obliquely rearward and upward from the front upper corner of the body portion, and then curves to extend rearward in the vehicle front-rear direction;

a rear end of the connecting member is positioned on an extension line extended forward in the vehicle front-rear direction from an arm portion of the arm portions; and a second annular shape projecting rearward in the vehicle front-rear direction in a plan view is made by the second cross member, the connecting members, and the cross-connection member.

* * * * *